(12) United States Patent
Uchida et al.

(10) Patent No.: US 7,033,567 B2
(45) Date of Patent: Apr. 25, 2006

(54) α-ALUMINA FINE POWDER AND A METHOD OF PRODUCING THE SAME

(75) Inventors: Yoshio Uchida, Tsukuba (JP); Toshifumi Katsuda, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 166 days.

(21) Appl. No.: 10/145,130

(22) Filed: May 15, 2002

(65) Prior Publication Data
US 2002/0187097 A1  Dec. 12, 2002

(30) Foreign Application Priority Data
May 21, 2001 (JP) ............................. 2001-150595
Oct. 10, 2001 (JP) ............................. 2001-312416

(51) Int. Cl.
*C01F 7/00* (2006.01)
(52) U.S. Cl. .................. 423/625; 423/111; 423/133
(58) Field of Classification Search ................. 423/625, 423/111, 133; 117/950
See application file for complete search history.

(56) References Cited

U.S. PATENT DOCUMENTS 4,657,754 A  4/1987 Bauer et al.
5,935,550 A  8/1999 Mohri et al.
6,165,437 A  12/2000 Mohri et al.

FOREIGN PATENT DOCUMENTS

| EP | 0 554 908 A1 | 8/1993 |
| EP | 0 620 188 A2 | 10/1994 |
| EP | 0 644 279 A1 | 3/1995 |
| EP | 0 656 319 A1 | 6/1995 |
| JP | 62-128918 A | 6/1987 |
| JP | 3-80106 A | 4/1991 |
| WO | WO 93/24682 A1 | 12/1993 |

*Primary Examiner*—Steven Bos
(74) *Attorney, Agent, or Firm*—Sughrue Mion, PLLC

(57) ABSTRACT

α-Alumina powder of fine particles having the primary particle diameters of from 10 nm to 100 nm, and of a high ratio of α-phase and further having capability to provide a sintered body with high density, and a method of manufacturing the α-alumina powder is provided. The method for manufacturing the α-alumina powder comprises a step of mixing an aluminum compound which is the precursor for the corresponding α-alumina and at least one selected from the group consisting of a titanium compound, an iron compound, a chromium compound, and α-alumina, and aluminum nitride, aluminum carbide and a aluminum boride as a seed crystal(s), and a step of calcining the mixture at a temperature of from 600° C. to 1000° C. in the presence of HCl gas in an concentration of 1% by volume to 20% by volume.

6 Claims, No Drawings

α-ALUMINA FINE POWDER AND A METHOD OF PRODUCING THE SAME

FIELD OF THE INVENTION

The present invention is related to α-alumina fine powder suitable for use in an abrasive and a material for sintered body and related to a method for manufacturing the same. More particularly the present invention relates to α-alumina fine powder having a primary particle diameters from 10 nm to 100 nm and a method for manufacturing the same.

BACKGROUND OF THE INVENTION

α-Alumina powder has been widely used as an abrasive, a material for sintered body and a filler. In the application to abrasive the smoother surface roughness is required. Particularly when a precision component such as a hard disk or a magnetic head is subjected to grind for polishing finish, a more finely milled α-alumina having a primary particle diameter not more than 100 nm has been required so as to lessen surface roughness after polishing finish.

In a conventional α-alumina powder, however, the content of the α-phase which have higher hardness is small and this raise a problem of small grinding rate and thus a fine powder of α-alumina having an high content of α-phase has been required.

In the application to the material for sintered body, a very fine α-alumina powder has been required since the strength of the sintered body is expected to become higher as the grain size of sintered body becomes finer. It is found, however, that as the primary particle diameter of conventional fine α-alumina powder becomes smaller the aggregate force of the powder becomes larger and this enhances tendency to provide the secondary particles which are produced by aggregating the primary particles.

Therefore even when the conventionally known α-alumina powder with small primary diameter is used, there remains voids in the sintered body since the conventional fine powder aggregates to form the secondary particles having larger particle diameter. Consequently it has been difficult to obtain a sintered body with high density. It has been desired to obtain an α-alumina powder which is small in particle size and is not susceptive to aggregation, i.e. weak in aggregate force in order to obtain a sintered body with a high degree of density.

As a method for manufacturing a fine α-alumina powder it is disclosed, for instance, in JP-A-62-128918 a method in which α-alumina particle is added to an alumina precursor such as an alumina-gel as a seed crystal and then the mixture is calcinated at from 900 to 1350° C. followed by milling to afford α-alumina powder with an average primary particle diameter of 70 nm. When a sintered body is provided using thus obtained α-alumina powder, the density of the sinter body is as low as 3.65 g/cm$^3$ (relative density 92%) and it is found that the α-alumina powder according to the above described method can not satisfactorily be used as the material for making sintered body.

Another method of manufacturing a fine alumina particles is disclosed in JP-A-03-080106 in which aluminum trichloride is calcinated at a temperature ranging from 1200 to 1700° C. Although the primary diameters of the resulting fine alumina particles will range from 50 to 200 nm, the content of α-phase alumina in the alumina powder is as low as 70% and can not satisfactorily be used as an abrasive.

SUMMARY OF THE INVENTION

The object of the present invention is to provide an α-alumina powder of fine particles with the primary particle diameter from 10 nm to 100 nm and having a high degree of α-phase content which will be able to afford a high density sintered body by sintering and a method for manufacturing the α-alumina powder as well.

In order to solve previously described problems, the inventors of the present invention have made intensive study on the method for manufacturing fine α-alumina powder and have discovered that an α-alumina powder of the fine particles with the primary particle diameter from 10 nm to 100 nm and having a high degree of α-phase content which will able to afford a high density sintered body by sintering can be obtained by calcinating a mixture comprising of an aluminum compound having capability to be converted into an α-alumina by calcination and a seed crystal at a specific temperature ranging form 600° C. to 1000° C. in the presence of hydrogen chloride gas.

Thus the present invention provides a method for manufacturing an a alumina powder wherein a mixture comprising an aluminum compound as a precursor for the α-alumina and at least one selected from the group consisting of a titanium compound, an iron compound, a chromium compound, α-alumina, aluminum nitride, aluminum carbide and an aluminum boride as a seed crystal is calcinated at a temperature from 600° C. to 1000° C. in the presence of hydrogen chloride gas with concentration of from about 1 volume % to about 20 volume %.

Further in the present invention, it is provided a method for manufacturing an α-alumina powder wherein the above mixture contains at least one selected from the group consisting of a silicon compound, a zirconium compound and a boron compound as a particle growth inhibiter.

Still further the present invention provides an α-alumina powder having the primary particle diameters of from 10 nm to 100 nm and having a polyhedral shape and α-phase in more than 90% by weight.

DETAILED DESCRIPTION OF THE INVENTION

The present invention is now explained in details as below.

An aluminum compound used as the precursor for α-alumina in the present invention (hereinafter sometimes referred as α-alumina precursor) designates an aluminum compound which provides α-alumina by calcination as described later. The aluminum compound may include transition alumina, aluminum hydroixe, aluminum nitrate, aluminum sulfate, aluminum chloride, aluminum ammonium alum and aluminum alkoxide. Among these aluminum compounds, transition alumina and aluminum hydroxide are preferable. The examples of aluminum hydroxide are gibbsite, bayerite, nordstrandite, boemite, boemite gel, quasi-boemite, diaspore and alumina gel. The examples of transition alumina are γ-, δ-and θ-alumina.

The seed crystal used for the present invention is compound selected from the group consisting of a titanium compound, an iron compound, a chromium compound, α-alumina, aluminum nitride, aluminum carbide and aluminum boride.

As the examples of compounds of titanium, iron and chromium, their oxides, nitrides, carbides and borides may be cited and more preferable examples are oxides of titanium, iron and chromium.

Among α-alumina, aluminum nitride, aluminum carbide and aluminum boride, α-alumina is particularly preferable. Among oxides of titanium, iron and chromium and α-alumina, titanium oxide is particularly preferable.

As a seed crystal, a fine powder having a mean primary particle diameter not more the 100 nm is preferable. The fine powder removed particles having the primary particle diameters exceeding 100 nm is more preferable as seed crystal. From the viewpoint of the primary particle diameter of the resulting α-alumina, the amount of seed crystal (the total amount of the seed crystals in the case where a plural kinds of seed crystals are used) may preferably be not less than 0.1% by weight of the sum of the converted amount of α-alumina precursor to the amount of α-alumina and the amount of seed crystal(s). The maximum amount of the seed crystal may be usually less than 30% by weight and the amount less than 10% by weight is preferable from the viewpoint of the amount of seed crystal(s) and its effectiveness.

In the method for manufacturing α-alumina powder the mixture comprising the α-alumina precursor and the seed crystal may further contain a particle growth inhibitor. The particle growth inhibitor used is at least one compound selected from the group consisting of silicone compound, zirconium compound and boron compound.

These compounds of silicone, zirconium and boron may include their oxides, nitrides, carbides, borides, ethylated compounds and amino compounds, and the amino compounds are preferable.

The amount of the particle growth inhibitor is preferably from 0.1 to 10 parts by weight based on 100 parts by weight of the converted amount α-alumina precursor to α-alumina and from 0.2 to 3 parts by weight is more preferable.

The mixture comprising the α-alumina precursor and the seed crystal is obtained by mixing the α-alumina precursor and the seed crystal. As the mixing method, any conventional methods used in the industry can be applied. They include, for instance, a process of mixing the both components of the α-alumina precursor and the seed crystal utilizing such an apparatus as a ball mill, a Dyno-mill (manufactured by Willy A. Bachofen AG Maschinenfabrik), a vibration mill, a vertical granulator and a Henshel mixer. The process of mixing may be either a dry processor a wet process. The same method of mixing may be utilized in the case where the particle growth inhibitor is contained.

In the method for manufacturing the α-alumina powder of the present invention, the mixture comprising the α-alumina precursor and the seed crystal is calcinated in the presence of hydrogen chloride gas in the concentration of from about 0.1 to about 20% by volume. The concentration of hydrogen chloride gas is preferably from about 1 to about 10% by volume. When the concentration of hydrogen chloride gas exceeds about 20% by volume, the primary particle diameters of particles of the resulting α-alumina powder may sometimes become larger than 100 nm. On the other hand when the concentration of hydrogen chloride gas is lower than about 0.1% volume, then the content of α-phase in the resulting α-alumina powder may be decreased. Another gas than hydrogen chloride gas such as air, nitrogen, argon or water vapor may be present with hydrogen chloride gas. When oxygen gas co-exist with hydrogen chloride gas, the conversion rate to α-phase may be sometimes increased. From this, air may be preferable to be present with hydrogen chloride. The temperature at which hydrogen chloride gas is introduced in an calcinating funerance is not limited.

In the method for manufacturing α-alumina powder of the present invention the calcination temperature is from 600° C. to 1000° C., and the temperature of from 800° C. to 980° C. is preferable. When the calcination temperature is higher than 1000° C., the primary particle diameters of the particles of the resulting α-alumina powder may occasionally be more than 100 nm. On the other hand when the calcination temperature is too low, then the content of α-phase may become sometimes as low as less than 90% by weight.

The resulted α-alumina powder may be further subjected to milling. The normal milling method utilizing either dry process or wet process can be applied for the purpose. A jet mill, a ball mill and a Dyno-mill will represent some of the examples. According to the method of manufacturing α-alumina powder of the present invention, particles in the resulted powder will exhibit weak aggregate forces. It is, therefore, unnecessary to apply any of the powerful milling technique and consequently the amount of contaminants such as chippings of milling media can be decreased.

According to the method for manufacturing of the present invention there is successfully provided an α-alumina powder having the primary particle diameters of from 10 nm to 100 nm and comprising particles with a polyhedral shape and further containing α-phase in an amount exceeding 90% by weight of the product α-alumina powder.

The above expression of "particles with a polyhedral shape" implies that the particles of resulted α-alumina powder have no fractured surfaces and are not amorphous. Because the α-alumina powder obtained according to the present invention contains a high degree of α-phase being high hardness, the abrasion rate will be accelerated when the obtained α-alumina powder is used as an abrasive. Additionally the polyhedral shape of the particles renders their aggregate force weakened and this restrains formation of secondary particles resulting in a dense sintered body having a high density when they are sintered.

Further in the case where a seed crystal other than aluminum compound is used, the used seed crystal will be homogeneously dispersed in the α-alumina powder product and this will achieve the most suitable use as a material for a composite sintered body.

Experiments

Now Examples of the present invention is described in details as below. It should be noted that the scope of the present invention is not limited by these Examples.

(1) measurement of BET relative surface area BET relative surface area was measured by FlowSorb II 2300 made by Shimazu Corporation.

(2) measurement of primary particle diameter Pictures of calcinated powder specimens were taken by a JEOL TEM: JEM 4000FX made by JEOL Ltd. and primary particle diameter was measured based on the pictures.

(3) measurement of the amount corresponding to α-phase X-ray diffraction patterns were measured by X-ray Diffraction Analyzer RU-200 made by Rigaku International Corp, and the phase of α-alumina was identified. The amount corresponding to α-phase was determined by ratio of height of the peak attributed to (440) plane of transition alumina to the height of peak attributed to (113) plane of α-alumina.

EXAMPLE 1

Aluminum hydroxide was prepared by hydrolysis of aluminum alkoxide and used as raw material. To aluminum hydroxide thus obtained 5% by weight (the amount of aluminum hydroxide was converted to corresponding amount of aluminum oxide) of titanium oxide TTO55N[R] (Trade Name, made by Ishihara Sangyo Kaisha Ltd.), which had been classified under wet environment to provide a powder of particles having particle diameters not more than 100 nm, was added and these were mixed in a ball mill using ethyl alcohol as a solvent.

The material was dried and placed in a tubular furnace. Then nitrogen containing 5% by volume of HCl gas was introduced into the furnace at room temperature. The mixture was calcinated for 1 hour at 915° C. The α-alumina powder thus obtained was a powder of particles of α-alumina having primary particle diameters of from 20 nm to 100 nm and being configured in a polyhedron. The content of α-phase was 98% by weight.

The α-alumina powder thus obtained was milled for 24 hours using a ball mill with ethyl alcohol as a solvent followed by drying. Then α-alumina powder was filled in a mold and subjected to an uniaxial press molding under pressure of 200 kg/cm² (20 MPa) and further press-molded by an cold isostatic press under 1.5 ton/cm² (150 MPa) pressure followed by sintering at 1400° C. for 2 hours. Density of sintered body was 3.95 g/cm³ (relative density 99.1%).

EXAMPLE 2

α-Alumina powder was prepared according to the same method as Example 1 except that the calcination temperature was 900° C. and the concentration of HCl gas was 10% by volume. The resulting α-alumina powder was a powder of α-alumina particles having the primary particle diameters of from 10 to 100 nm and having a polyhedral shape. The content of α-phase was 97% by weight.

EXAMPLE 3

α-Alumina powder was prepared according to the same method as Example 1 except that 20% by weight of the titanium oxide powder was added and the calcinating temperature was 860° C., concentration of HCl gas was 10% by volume and water vapor was added to the calcination atmosphere so that the dew point became 20° C. The resulting α-alumina powder was a powder of α-alumina particles having the primary particle diameters ranging from 10 nm to 100 nm and having a polyhedral shape. The content of α-phase was 98% by weight. A sintered body was prepared according to the same method as Example 1 and density of the resulted sinter body was 3.96 g /cm³ (relative density 99.3%)

EXAMPLE 4

α-Alumina powder was prepared according to the same method as Example 1 except that 20% by weight of the titanium oxide powder was added and the calcinating temperature was 870° C., concentration of HCl gas was 10% by volume. The resulting α-alumina powder was a powder of α-alumina particles having the primary particle diameters ranging from 10 nm to 100 nm and having a polyhedral shape The content of α-phase was 97% by weight.

EXAMPLE 5

α-Alumina powder was prepared according to the same method as Example 1 except that 30% by weight of the titanium oxide powder was added and the calcinating temperature was 870° C., concentration of HCl gas was 10% by volume. The resulting α-alumina powder was a powder of α-alumina particles having the primary particle diameters ranging from 10 nm to 100 nm and having a polyhedral shape. The content of α-phase was 98% by weight.

EXAMPLE 6

α-Alumina powder was prepared according to the same method as Example 1 except that chromium oxide powder was used as the seed crystal and HCl gas was introduced when the temperature of the calcinating furnace had reached 915° C. The resulting α-alumina powder was a powder of α-alumina particles having the primary particle diameters ranging from 20 nm to 100 nm and having a polyhedral shape configuration. The content of α-phase was 98% by weight.

EXAMPLE 7

α-Alumina powder was prepared according to the same method as Example 1 except that iron oxide powder was used as the seed crystal and HCl gas was introduced when the temperature of the calcinating furnace had reached 915° C. The resulting α-alumina powder was a powder of α-alumina particles having the primary particle diameters ranging from 20 nm to 100 nm and having a polyhedral shape. The content of α-phase was 98% by weight.

COMPARATIVE EXAMPLE 1

Alumina powder was prepared according to the same method as Example 1 except that titanium oxide was not added. The content of α-phase was zero % and it was found that all of the product alumina powder was transition alumina.

COMPARATIVE EXAMPLE 2

Alumina powder was prepared according to the same method as Example 1 except that the calcinating temperature was 1100° C. The mean value of the primary particle diameter was 200 nm and obtained alumina powder was a powder of α-alumina particles of large size. A sintered body was prepared according to the same method as Example 1 and density of the sintered body was as low as 3.85 g/cm³ (relative density 96.6%).

COMPARATIVE EXAMPLE 3

Alumina powder was prepared according to the same method as Example 1 except that the calcinating temperature was 500° C. The content of α-phase was zero % and it was found that all of the product alumina powder was transition alumina.

EXAMPLE 8

Aluminum hydroxide was prepared by hydrolysis of aluminum alkoxide and used as raw material. To aluminum hydroxide thus obtained 10% by weight (the amount of aluminum hydroxide was converted to corresponding amount of aluminum oxide) of titanium oxide TTO55N[R] (Trade Name, made by Ishihara Sangyo Kaisha Ltd.) and 0.6 part by weight of Aminosilane A-1100[R] (Trade Name; γ-aminopropyltriethoxysilane, made by NihonUnicar Co., Ltd.) was added and these were mixed in a ball mill using ethyl alcohol as a solvent.

The material was dried and placed in a tubular furnace. The heating of the furnace was initiated and the temperature of the furnace was raised under air without HCl gas until the temperature had reached 600° C. Then an air containing 10% by volume of HCl as was introduced into the furnace and was calcinated at 960° C. for 2 hour. The alumina powder thus obtained was a powder of particles of α-alumina having primary particle diameters of from 20 nm to 80 nm and being configured in a polyhedron. The content of α-phase was 99% by weight.

EXAMPLE 9

Alumina powder was prepared in the same manner as Example 8 except that nitrogen containing 10% by volume of HCl gas was used instead of air containing 10% by volume of HCl gas and the calcinating temperature was 980° C. The resulted alumina powder was a powder of α-alumina particles having the primary particles diameters ranging from 20 nm to 80 nm with polyhedral shape. The content of α-phase was 99% by weight.

EXAMPLE 10

Alumina powder was prepared in the same manner as Example 8 except that aminosilane was added 0.3 part by weight and the calcinating temperature was 950° C. The resulted alumina powder was a powder of α-alumina particles having the primary particles diameters ranging from 20 nm to 80 nm with polyhedral shape. The content of α-phase was 99% by weight.

EXAMPLE 11

Alumina powder was prepared in the same manner as Expample 8 except that aminosilane was added 0.3 part by weight and nitrogen containing 10% by volume of HCl gas was used instead of air containing 10% by volume of HCl gas and the calcinating temperature was 950° C. The resulted alumina powder was a powder of α-alumina particles having the primary particles diameters of from 20 nm to 80 nm with polyhedral shape. The content of α-phase was 98% by weight.

COMPARATIVE EXAMPLE 4

Alumina powder was prepared in the same manner as Example 8 except that titanium oxide powder and aminosilane were not added and the concentration of HCl was 5% by volume and nitrogen was used as the calcinating atmosphere in stead of air and the calcinating temperature was 915° C. and finally calcinating period was 1 hour. The content of α-phase in the resulted alumina powder was zero % and it was found that all of the resulted alumina powder was transition alumina.

COMPARATIVE EXAMPLE 5

Alumina powder was prepared in the same manner as Expample 8 except that aminosilane was not added and concentration of HCl was 5% by volume and nitrogen was used as the calcinating atmosphere instead of air and calcinating period is 1 hour. The mean value of primary particle diameters of the resulting alumina powder was 200 nm.

COMPARATIVE EXAMPLE 6

Alumina powder was prepared in the same manner as Example 8 except that aminosilane was not added and concentration of HCl was 5% by volume and nitrogen was used as the calcinating atmosphere instead of air and the calcinating temperature was 500° C. and the calcinating period is 1 hour. The content of α-phase in the alumina powder obtained was zero % and it was found that all of the resulted alumina powder was transition alumina.

According to the method of manufacturing of the present invention it has become possible to make an α-alumina powder of particles where the primary particle diameters are within an range of 10 to 100 nm and particles are configured in a polyhedral shape and the shape is homogeneous. The α-alumina powder of the invention is excellent in distribution capability and either of the aggregate particles or coarse grains are seldom found. As the α-alumina powder obtained by the method of the present invention can be adequately used as a material for sintered body, an abrasive and a filler, broad applications will be expected in various industries.

What is claimed is:

1. A method for manufacturing α-alumina powder comprising:
   a step of mixing an aluminum compound as a precursor for α-alumina and at least one selected from the group consisting of titanium compound, iron compound, chromium compound, α-alumina, aluminum nitride, aluminum carbide and aluminum boride as a seed crystal, and
   a step of calcining the mixture at a temperature from 600° C. to 1000° C. in the presence of HCl gas in a concentration of from about 1% by volume to about 20% by volume,
   wherein the seed crystal is a powder with mean primary particle diameters of not more than 100 nm.

2. The method for manufacturing α-alumina powder according to claim 1, wherein the mixing step is a step of mixing the precursor, the seed crystal and at least one selected from the group consisting of a silicon compound, a zirconium compound and a boron compound as a particle growth inhibiter.

3. The method for manufacturing α-alumina powder according to claim 1, wherein the concentration of HCl gas is from about 1% by volume to about 10% by volume.

4. The method for manufacturing α-alumina powder according to claim 1, wherein the aluminum compound is at least one of aluminum hydroxide or transition aluminum.

5. The method for manufacturing α-alumina powder according to claim 1, wherein the seed crystal is a powder with the primary particle diameters less than 100 nm.

6. The method for manufacturing α-alumina powder according to claim 1, wherein the amount of the seed crystal is from 0.1% by weight to 30% by weight of the sum of the amount of the aluminum compound as precursor in terms of α-alumina and the amount of the seed crystal.

* * * * *